(12) United States Patent
Lu

(10) Patent No.: US 10,175,913 B2
(45) Date of Patent: Jan. 8, 2019

(54) LINK MANAGEMENT METHOD AND PHYSICAL DEVICE

(71) Applicant: Huawei Technologies Co., Ltd., Shenzhen (CN)

(72) Inventor: Hui Lu, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/713,144

(22) Filed: Sep. 22, 2017

(65) Prior Publication Data

US 2018/0088866 A1    Mar. 29, 2018

(30) Foreign Application Priority Data

Sep. 23, 2016  (CN) .......................... 2016 1 0848594

(51) Int. Cl.
| | | |
|---|---|---|
| G06F 12/02 | (2006.01) | |
| G06F 3/06 | (2006.01) | |
| G06F 5/06 | (2006.01) | |
| G06F 5/08 | (2006.01) | |
| G06F 12/06 | (2006.01) | |

(52) U.S. Cl.
CPC .......... *G06F 3/0659* (2013.01); *G06F 3/0604* (2013.01); *G06F 3/0649* (2013.01); *G06F 5/06* (2013.01); *G06F 5/08* (2013.01); *G06F 12/023* (2013.01); *G06F 12/0607* (2013.01); *G06F 2003/0697* (2013.01); *G06F 2205/064* (2013.01); *G06F 2212/1016* (2013.01); *G06F 2212/1028* (2013.01); *G06F 2212/1044* (2013.01); *Y02D 10/45* (2018.01)

(58) Field of Classification Search
CPC ....... G06F 3/0659; G06F 5/08; G06F 12/0607
USPC ......................................................... 711/154
See application file for complete search history.

(56) References Cited

U.S. PATENT DOCUMENTS

| | | | |
|---|---|---|---|
| 5,838,915 A | 11/1998 | Klausmeier et al. | |
| 2003/0145012 A1* | 7/2003 | Kurth ............... | G06F 17/30958 |
| 2006/0031643 A1 | 2/2006 | Figueira | |

FOREIGN PATENT DOCUMENTS

| | | |
|---|---|---|
| CA | 2290265 A1 | 5/2001 |
| WO | 9631820 A1 | 10/1996 |

\* cited by examiner

*Primary Examiner* — Jae U Yu
(74) *Attorney, Agent, or Firm* — Leydig, Voit & Mayer, Ltd.

(57) ABSTRACT

This application provides a link management method. The physical device includes a first memory that stores a tail pointer of a link and a second memory that stores a head pointer of the link, and the physical device supports one time of enqueue processing and one time of dequeue processing in one clock cycle. The method includes: when a first link is not empty before the enqueue processing, modifying, by the physical device, a first tail pointer that is of the first link and that is in the first memory; and when a second link is not empty after the dequeue processing, modifying, by the physical device, a second head pointer that is of the second link and that is in the second memory.

10 Claims, 1 Drawing Sheet

---

101

When a physical device performs enqueue processing on a first link, and when the first link is not empty before the enqueue processing, the physical device modifies a first tail pointer that is of the first link and that is in a first memory, so that a modified first tail pointer points to a storage location of the last node in a first link obtained after the enqueue processing

102

When the physical device performs dequeue processing on a second link, and when the second link is not empty after the dequeue processing, the physical device modifies a second head pointer that is of the second link and that is in a second memory, so that a modified second head pointer points to a storage location of the first node in a second link obtained after the dequeue processing

LINK MANAGEMENT METHOD AND PHYSICAL DEVICE

CROSS-REFERENCE TO RELATED APPLICATION

This application claims priority to Chinese Patent Application No. 201610848594.0, filed on Sep. 23, 2016, which is hereby incorporated by reference in its entirety.

TECHNICAL FIELD

This application relates to the field of storage technologies, and in particular, to a link management method and a physical device.

BACKGROUND

A linked storage structure of a linear list is characterized in that, data elements of the linear list are stored by using a group of storage units, and the group of storage units may be or may not be sequential. The linear list is also referred to as a linked list. To represent a logical relationship between each data element $a_i$ and a direct successor data element $a_{i+1}$ of $a_i$, a storage unit that stores the data element $a_i$ further needs to store a storage location (also referred to as a pointer) indicating the direct successor data element $a_{i+1}$ of $a_i$. The two parts of information: the data element $a_i$ and the pointer that are stored in the storage unit constitute a node of the data element $a_i$. In the storage unit, a field that stores the data element $a_i$ is referred to as a data field, and a field that stores the pointer is referred to as a pointer field. A link ($a_1$, $a_2$, ..., and $a_n$) is formed by linking n nodes (node $a_i$ ($1 \leq i \leq n$)), and a linked list includes multiple links.

The linked list is a set of data storage nodes. The nodes are linked by using pointers, to form a queue. After the linked list is stored in a memory, a dedicated memory is further needed to store management information of each link in the linked list. The dedicated memory is also referred to as a management information memory. Management information of any link includes information such as a head pointer indicating a storage location of a queue head (the first node) of the link, a tail pointer indicating a storage location of a queue tail (the last node) of the link, and a length of the link (a quantity of nodes included in the link).

A physical device to which the memory belongs may process a node in a link in the linked list in the memory. For example, the physical device performs an enqueue operation, that is, the physical device adds a new node to a queue tail of the link; or the physical device performs a dequeue operation, that is, the physical device removes a node from a queue head of the link.

Conventionally, during the enqueue operation of the link in one clock cycle, steps for processing, by the physical device, management information of the link include:

obtaining, by the physical device, an original length of the link;

when the original length is 0, modifying, by the physical device, both a head pointer and a tail pointer of the link; or when the original length is not 0, modifying, by the physical device, only a tail pointer of the link; and modifying, by the physical device, the length of the link, where a new length obtained after the modification is the original length plus 1.

Conventionally, during the dequeue operation of the link in one clock cycle, steps for processing, by the physical device, management information of the link include:

determining, by the physical device, a total quantity of nodes removed during the dequeue operation;

obtaining, by the physical device, an original length of the link;

determining, by the physical device, a new length of the link, and updating the new length to a management information memory of the link, where the new length is obtained by subtracting the total quantity of removed nodes from the original length; and when the new length is not 0, modifying, by the physical device, a head pointer of the link; or when the new length is 0, skipping performing, by the physical device, any operation.

To ensure input/output performance of the physical device, the physical device needs to support one enqueue operation and one dequeue operation in one clock cycle. According to the foregoing description, the physical device needs to access and modify the link management information during both the dequeue operation and the enqueue operation, and the management information memory needs to support two reads two writes in one clock cycle. As a result, access overheads of the management information memory are relatively large. The two reads two writes include one read (that is, reading an original length and an original tail pointer of a link) one write (modifying the length and the tail pointer of the link, and further modifying a head pointer when the original length is 0) during the enqueue operation, and one read (reading an original length and an original head pointer of a link) one write (that is, modifying the length and the head pointer of the link) during the dequeue operation.

Because a linked list usually needs to include a huge quantity of links, management information of a link in a management information memory also occupies large space. For example, if there are 1 M (M) links in a linked list stored in a memory in a physical device, and each link can occupy 256 nodes, the management information memory requires at least a depth of 1 M and a bit width of 90 bits (b), that is, the management information memory requires a storage capacity of approximately 90 megabits (Mb).

It can be learned from the foregoing description that the management information memory has a capability of two reads two writes per clock cycle. Therefore, the management information memory needs to have four ports. Because of different quantities of ports that support simultaneous access, implementation costs memories are different. In addition, a larger quantity of ports of a memory indicates larger implementation costs. For example, an area and power consumption of a four-port memory are approximately four times greater than an area and power consumption of a two-port memory. In conclusion, because the management information memory not only needs to have a capability of two reads two writes per clock cycle, but also needs to have a relatively large capacity, costs and power consumption of the management information memory are relatively large.

SUMMARY

This application provides a link management method and a physical device, so as to resolve prior-art problems of relatively large costs and power consumption caused because a conventional management information memory is a mass memory that has a capability of two reads two writes per clock cycle.

Specific technical solutions provided in this application are as follows:

According to one aspect, an embodiment of this application provides a link management method. The method is applied to a physical device that has a first memory and a second memory. The physical device stores a linked list. The first memory stores a tail pointer of each of multiple links included in the linked list, and the second memory stores a head pointer of each link. The physical device is capable of implementing enqueue processing on a first link of the multiple links and dequeue processing on a second link of the multiple links in one clock cycle. The method includes: when the physical device performs enqueue processing on the first link, and when the first link is not empty before the enqueue processing, modifying, by the physical device, a first tail pointer that is of the first link and that is in the first memory, so that the modified first tail pointer points to a storage location of the last node in the first link obtained after the enqueue processing; and when the physical device performs dequeue processing on the second link, and when the second link is not empty after the dequeue processing, modifying, by the physical device, a second head pointer that is of the second link and that is in the second memory, so that the modified second head pointer points to a storage location of the first node in the second link obtained after the dequeue processing.

By using the method, when the physical device performs enqueue processing on the first link and/or performs dequeue processing on the second link in one clock cycle, access rates of the first memory and the second memory are greatly reduced, and are both only one read one write, and the two memories each store only a part of link management information. Because an access rate of each memory is one read one write, and each memory is apparently a two-port memory, an area and power consumption of each memory can be significantly reduced in comparison with a conventional four-port management information memory. In addition, because each memory stores only a part of management information, storage pressure and a storage capacity requirement of each memory are also reduced. Therefore, by using the method, performance requirements of the management information memories (that is, the two memories) are reduced while input/output performance of the physical device is ensured, so as to reduce costs and power consumption of the management information memories.

In a possible design, when the first link is empty before the enqueue, the physical device not only modifies a first tail pointer that is of the first link and that is in the first memory, but also needs to modify a first head pointer that is of the first link and that is in the second memory, so that the modified first head pointer points to a storage location of the first node in the first link obtained after the enqueue processing.

By using the method, when performing enqueue processing on the first link, the physical device can manage the head pointer and the tail pointer of the first link.

In a possible design, the first memory further stores a first status identifier of each link, the second memory further stores a second status identifier of each link, and the physical device further has a third memory that stores a third status identifier of each link. A first status identifier of any link is the same as a second status identifier of the link, and both a combination of the first status identifier and a third status identifier of the link and a combination of the second status identifier and the third status identifier of the link can indicate whether the link is empty. In a scenario in which the three memories each store a corresponding status identifier of each link, when performing enqueue processing on the first link, the physical device may determine, by using the following steps, whether the first link is empty before the enqueue processing:

first, reading a first status identifier and a third status identifier of the first link respectively from the first memory and the third memory; and then determining, according to the first status identifier and the third status identifier of the first link, whether the first link is empty before the enqueue processing.

By using the method, when the physical device performs enqueue processing on the first link, the physical device may directly determine, according to a combination of the first status identifier and the third status identifier of the first link, whether the first link is empty, so as to improve efficiency of determining a status of the first link by the physical device.

In a possible design, in the scenario in which the physical device stores the corresponding status identifier of each link by using the three memories in the foregoing design, when the physical device performs dequeue processing on the second link, and when the second link is empty after the dequeue processing, the physical device modifies, according to a second status identifier that is of the second link and that is in the second memory, a third status identifier that is of the second link and that is in the third memory, so that a combination of the second status identifier and the modified third status identifier of the second link indicates that the second link obtained after the dequeue processing is empty.

When the physical device performs dequeue processing on the second link, if the second link is empty after the dequeue processing, the physical device further needs to modify the third status identifier of the second link, so that when the physical device subsequently performs enqueue processing on the second link, the physical device can determine, according to a combination of a first status identifier and the third status identifier of the second link, that the second link is empty. Efficiency of subsequently determining a status of the second link by the physical device can be improved by using the method.

In a possible design, when the physical device performs enqueue processing on the first link, and when the physical device determines that the first link is empty before the enqueue processing, the physical device performs the following operations:

A. modifying the first status identifier that is of the first link and that is in the first memory, so that a combination of the third status identifier and the modified first status identifier of the first link indicates that the first link obtained after the enqueue processing is not empty; B. modifying the first tail pointer that is of the first link and that is in the first memory, so that the modified first tail pointer points to the storage location of the last node in the first link obtained after the enqueue processing; C. modifying a second status identifier that is of the first link and that is in the second memory, so that a modified second status identifier of the first link is the same as the modified first status identifier of the first link; and D. modifying a first head pointer that is of the first link and that is in the second memory, so that the modified first head pointer points to a storage location of the first node in the first link obtained after the enqueue processing.

By using the method, when performing enqueue processing on the first link, the physical device can manage the head pointer, the tail pointer, and each status identifier of the first link.

In a possible design, the first memory further stores a length of each link. When performing enqueue processing and dequeue processing, the physical device further needs to manage a length of a link.

When the physical device performs enqueue processing on the first link, the physical device manages a length of the first link by using the following steps: when the first link is not empty before the enqueue processing, reading, by the physical device, a first length of the first link from the first memory, obtaining a new first length according to the first length and a total quantity of enqueued nodes, and updating the first length to the first memory; or when the first link is not empty before the enqueue processing, using, by the physical device, a total quantity of enqueued nodes as a first length of the first link, and updating the first length of the first link to the first memory.

When the physical device performs dequeue processing on the second link, the physical device manages a length of the second link by using the following steps: when the second link is not empty after the dequeue processing, reading, by the physical device, a second length of the second link from the first memory, obtaining a new second length according to the second length and a total quantity of dequeued nodes, and updating the second length to the first memory.

By using the method, the physical device can manage the length of the first link when the physical device performs enqueue processing on the first link, and the physical device can manage the length of the second link when the physical device performs dequeue processing on the second link.

According to another aspect, an embodiment of the present invention further provides a physical device, and the physical device has a function of implementing behavior of the physical device in the method embodiment. The function may be implemented by hardware, or may be implemented by executing corresponding software by hardware. The hardware or the software includes one or more modules corresponding to the function.

In a possible design, a structure of the physical device includes a first memory, a second memory, a processor, a bus, and a data memory. The data memory is configured to store a linked list. The first memory is configured to store a tail pointer of each link in the linked list. The second memory is configured to store a head pointer of each link. The processor is configured to support the physical device in implementing the corresponding function in the foregoing method. The data memory is coupled to the processor, and the data memory stores necessary program instructions and data of the processor.

In the link management method provided in the embodiments of the present invention, a physical device stores management information of each link in a linked list by using two memories, including a first memory that stores a tail pointer of the link and a second memory that stores a head pointer of the link. When the physical device implements one time of enqueue processing and one time of dequeue processing in one clock cycle, an access rate of each memory is one read one write. Therefore, by using the method provided in the embodiments of this application, while input/output performance (supporting one enqueue operation and one dequeue operation in one clock cycle) of the physical device is ensured, the access rate of each memory is greatly reduced, and each memory only needs to have a capability of one read one write. Apparently, each memory is a two-port memory, and an area and power consumption of each memory can be significantly reduced in comparison with a conventional four-port management information memory. In addition, because each memory stores only a part of management information, storage pressure and a storage capacity requirement of each memory are also reduced. Therefore, performance requirements of the management information memories (that is, the two memories) are reduced by using the method, so as to reduce costs and power consumption of the management information memories.

DESCRIPTION OF EMBODIMENTS

Figure 1:
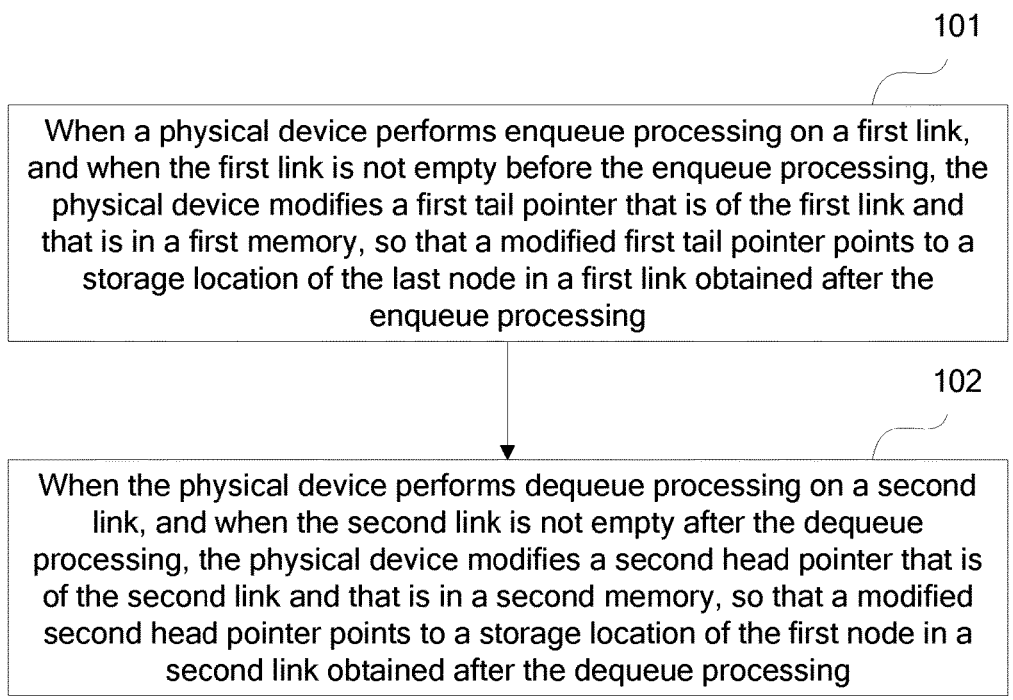
FIG. 1 is a flowchart of a link management method according to an embodiment of this application.

To make the objectives, technical solutions, and advantages of this application clearer, the following further describes this application in detail with reference to the accompanying drawings. Apparently, the described embodiments are merely a part rather than all of the embodiments of this application. All other embodiments obtained by a person of ordinary skill in the art based on the embodiments of this application without creative efforts shall fall within the protection scope of this application.

The embodiments of this application provide a link management method and a physical device, so as to resolve prior-art problems of relatively large costs and power consumption caused because a conventional management information memory is a mass memory that has a capability of two reads two writes per clock cycle. The method and the apparatus in this application are based on a same inventive concept. Because the method and the physical device have similar principles for resolving the problems, mutual reference may be made between apparatus implementation and method implementation. No repeated description is provided.

In the embodiments of this application, the physical device has two memories configured to store management information of each link in a linked list. The two memories include a first memory that stores a tail pointer of the link and a second memory that stores a head pointer of the link. The physical device supports one time of enqueue processing and one time of dequeue processing in one clock cycle. When the physical device performs enqueue processing on a first link in the linked list, and when the first link is not empty before the enqueue processing, the physical device modifies a first tail pointer that is of the first link and that is in the first memory. When the physical device performs dequeue processing on a second link in the linked list, and when the second link is not empty after the dequeue processing, the physical device modifies a second head pointer that is of the second link and that is in the second memory. It can be learned from the foregoing description that while input/output performance (supporting one enqueue operation and one dequeue operation in one clock cycle) of the physical device is ensured, access rates of the first memory and the second memory are greatly reduced, both the first memory and the second memory only need to have a capability of one read one write, and the two memories each store only a part of link management information. Because an access rate of each memory is one read one write, and each memory is apparently a two-port memory, an area and power consumption of each memory can be significantly reduced in comparison with a conventional four-port management information memory. In addition, because each memory stores only a part of management information, storage pressure and a storage capacity requirement of each memory are also reduced. Therefore, performance requirements of the management information memories (that is, the two memories) are reduced by using the method, so as to reduce costs and power consumption of the management information memories.

The following explains some users in this application to facilitate understanding by a person skilled in the art.

The physical device in the embodiments of this application includes various types of devices that can store data by using a linked list. To ensure the input/output performance of the physical device, the physical device is capable of performing one time of enqueue processing and one time of dequeue processing in one clock cycle. A component that implements the enqueue processing and/or the dequeue processing may be a processor or other dedicated hardware in the physical device. The dedicated hardware is, for example, a dedicated chip that is responsible for a queue management function in a router or a switch.

The first memory in this application is a management information memory in the physical device, and is configured to store a tail pointer of each link included in the linked list stored in the physical device. Optionally, the first memory further stores a first status identifier of each link, and the first status identifier may be represented as an E identifier. In addition, the first memory may further store a length of each link.

The second memory in this application is a management information memory in the physical device, and is configured to store a head pointer of each link included in the linked list stored in the physical device. Optionally, the second memory further stores a second status identifier of each link, and the second status identifier is consistent with the first status identifier and may also be represented as an E identifier. In addition, the second memory may also store the length of each link. In a physical device, a length of each link only needs to be stored in either the first memory or the second memory.

A third memory designed in this application is a management information memory in the physical device. When the first memory and the second memory in the physical device respectively store the first status identifier and the second status identifier of each link, the physical device further uses the third memory to store a third status identifier. The third status identifier may be represented as an N identifier. A combination of a first status identifier and a third status identifier of any link is used to indicate whether the link is empty, and a combination of a second status identifier and the third status identifier of the link is used to indicate whether the link is empty, that is, an E identifier and an N identifier of the link can indicate whether the link is empty.

The E identifier and the N identifier in this application each may be a field of a specified quantity of bits in a corresponding memory. Optionally, if the E identifier and the N identifier each may be a 1-bit field, a correspondence between a link status, and values of the E identifier of the link and the N identifier of the link may be shown in Table 1 or Table 2. This is not limited in this application.

TABLE 1

| E identifier | 0 | 0 | 1 | 1 |
| N identifier | 0 | 1 | 0 | 1 |
| Link status | Empty | Not empty | Not empty | Empty |

TABLE 2

| E identifier | 0 | 0 | 1 | 1 |
| N identifier | 0 | 1 | 0 | 1 |
| Link status | Empty | Not empty | Not empty | Empty |

The "multiple" in the embodiments of this application refers to "two or more".

The term "and/or" is an associative relationship for describing associated objects and indicates that three relationships may exist. For example, A and/or B may represent the following three cases: Only A exists, both A and B exist, and only B exists. The character "/" generally indicates an "or" relationship between the associated objects.

In addition, it should be understood that in the description of this application, the words "first", "second", and the like are merely used for distinction description, and shall not be understood as an indication or implication of relative importance or an indication or implication of an order.

To more clearly describe the technical solutions in the embodiments of this application, with reference to FIG. 1, the following describes a procedure of a link management method provided in an embodiment of this application. The method is applied to a physical device that stores data by using a linked list. The physical device further has a first memory and a second memory. The first memory is configured to store a tail pointer of each link in the linked list, and the second memory is configured to store a head pointer of each link. The physical device is capable of implementing enqueue processing on a first link in the linked list and dequeue processing on a second link in one clock cycle. However, the physical device specifically implements one time of enqueue processing and/or one time of dequeue processing in one clock cycle. Referring to FIG. 1, the processing procedure of the method includes the following steps.

Step 101: When the physical device performs enqueue processing on the first link, and when the first link is not empty before the enqueue processing, the physical device modifies a first tail pointer that is of the first link and that is in the first memory, so that the modified first tail pointer points to a storage location of the last node in the first link obtained after the enqueue processing.

Optionally, when the first link is empty before the enqueue processing, the physical device not only modifies a first tail pointer that is of the first link and that is in the first memory, but also needs to modify a first head pointer that is of the first link and that is in the second memory, so that the modified first head pointer points to a storage location of the first node in the first link obtained after the enqueue processing.

Step 102: When the physical device performs dequeue processing on the second link, and when the second link is not empty after the dequeue processing, the physical device modifies a second head pointer that is of the second link and that is in the second memory, so that the modified second head pointer points to a storage location of the first node in the second link obtained after the dequeue processing.

Optionally, the physical device may determine, in multiple manners, whether the second link is empty after the dequeue processing. For example, the physical device may detect whether a length of the second link is 0 after the dequeue processing, or may detect whether a next node to which a pointer included in a current node (the last node) in the second link points is empty, to determine whether the second link is empty after the dequeue processing.

Optionally, when the second link is empty after the dequeue processing, the physical device may use a conventional manner, that is, do not perform any operation.

This embodiment of this application sets no limitation to an order in which the physical device performs step 101 and step 102.

In the link management method provided in this embodiment of this application, when the physical device performs enqueue processing on the first link and/or performs dequeue processing on the second link in one clock cycle, access rates of the first memory and the second memory are greatly reduced, and are both only one read one write, and the two memories each store only a part of link management information. Because an access rate of each memory is one read one write, and each memory is apparently a two-port memory, an area and power consumption of each memory can be significantly reduced in comparison with a conventional four-port management information memory. In addition, because each memory stores only a part of management information, storage pressure and a storage capacity requirement of each memory are also reduced. Therefore, by using the method, performance requirements of the management information memories (that is, the two memories) are reduced while input/output performance of the physical device is ensured, so as to reduce costs and power consumption of the management information memories.

Optionally, to improve efficiency of determining a link status (empty or not) by the physical device, the first memory further stores a first status identifier of each link, the second memory further stores a second status identifier of each link, and the physical device further has a third memory. The third memory is configured to store a third status identifier of each link. A first status identifier of any link is the same as a second status identifier of the link. A combination of the first status identifier and a third status identifier of the link is used to indicate whether the link is empty, and a combination of the second status identifier and the third status identifier of the link is used to indicate whether the link is empty.

By using the method, when the physical device performs enqueue processing on the first link, the physical device may directly determine, according to a combination of a first status identifier and a third status identifier of the first link, whether the first link is empty, so as to improve efficiency of determining a status of the first link by the physical device.

When the three memories each store a corresponding status identifier of each link, and when the physical device performs enqueue processing on the first link, the method further includes: determining, by the physical device, whether the first link is empty before the enqueue processing, specifically including:

reading, by the physical device, a first status identifier and a third status identifier of the first link respectively from the first memory and the third memory; and determining, by the physical device according to the first status identifier and the third status identifier of the first link, whether the first link is empty before the enqueue processing. For example, when a correspondence between a link status, and values of an E identifier of a link and an N identifier of the link is shown in Table 1, if a value of the first status identifier (E identifier) that is read by the physical device is 1, and a value of the third status identifier (N identifier) that is read by the physical device is 0, it can be learned from the correspondence shown in Table 1 that the physical device determines that the first link is not empty.

In addition, when the physical device performs dequeue processing on the second link, if the second link is empty after the dequeue processing, the physical device further needs to modify a third status identifier of the second link, so that when the physical device subsequently performs enqueue processing on the second link, the physical device can determine, according to a combination of a first status identifier and the third status identifier of the second link, that the second link is empty. When the physical device performs dequeue processing on the second link, the method further includes:

when the second link is empty after the dequeue processing, modifying, by the physical device according to a second status identifier that is of the second link and that is in the second memory, a third status identifier that is of the second link and that is in the third memory, so that a combination of the second status identifier and the modified third status identifier of the second link indicates that the second link obtained after the dequeue processing is empty.

Efficiency of determining a status of the second link by the physical device is improved by using the method.

Optionally, when the physical device performs enqueue processing on the first link, the method further includes:

when the physical device determines that the first link is empty before the enqueue processing, performing, by the physical device, the following operations:

modifying the first status identifier that is of the first link and that is in the first memory, so that a combination of the third status identifier and the modified first status identifier of the first link indicates that the first link obtained after the enqueue processing is not empty;

modifying the first tail pointer that is of the first link and that is in the first memory, so that the modified first tail pointer points to the storage location of the last node in the first link obtained after the enqueue processing;

modifying a second status identifier that is of the first link and that is in the second memory, so that a modified second status identifier of the first link is the same as the modified first status identifier of the first link; and modifying a first head pointer that is of the first link and that is in the second memory, so that the modified first head pointer points to a storage location of the first node in the first link obtained after the enqueue processing.

It can be learned from the foregoing description that when none of the first memory, the second memory, and the third memory store a length of each link, the first memory supports one read (reading the first tail pointer and the first status identifier of the first link during enqueue processing on the first link) one write (modifying the first tail pointer, and further modifying the first status identifier when the first link is empty before the enqueue processing) per clock cycle.

A capability requirement of the second memory is analyzed as follows:

Each node in each link in the linked list stores a fixed data volume, for example, 64 bytes (B), and usually a data volume dequeued each time is obviously greater than 64 B. When a data volume stored in a link exceeds 1 KB, a data volume dequeued each time is at least 1 KB, that is, at least 16 nodes in total are dequeued each time. One node is dequeued each time only when there is only one node in the link.

In a worst read scenario, after only one 64-B node is dequeued each time from each link, the link becomes empty. However, in this case, link management information in the second memory does not need to be modified, and a write access rate of the second memory is one write performed when the physical device performs enqueue processing.

Therefore, in this scenario, an access rate requirement of the second memory is one read one write.

In a worst read/write scenario, after one 64-B node is dequeued at a time from some links, and 16 64-B nodes are dequeued at a time from some other links, these links do not become empty. For example, after only one node is dequeued from each of 15 consecutive links, and 16 nodes are dequeued at a time from the $16^{th}$ link, these links become empty. In this case, a quantity of read times of the second memory is 16 times within 31 beats, and a quantity of write times is 32 times (including 31 times of enqueue and one time of dequeue) within 31 beats. Therefore, a write access rate of the second memory is approximately $(1-1/16)$ times, and a read access rate of the second memory is $(1+1/16)$.

It can be learned from the foregoing description that a case in which the link obtained after the dequeue processing does not become empty occurs only once each time 16 nodes are dequeued from the link. Therefore, in the foregoing case, the second memory supports one read $(1+1/16)$ writes (modifying the second status identifier and the first head pointer of the first link, and modifying the second head pointer for $1/16$ times in one cycle) per clock cycle. During the dequeue processing on the second link, the second head pointer of the second link is read and modified only once per 16 clock cycles.

The third memory supports one read (reading the third status identifier of the first link once during the enqueue processing on the first link) one write (modifying the third status identifier of the second link when the second link is empty after the dequeue processing) per clock cycle.

In conclusion, when the three memories each store the corresponding status identifier of each link, a maximum access rate of each memory is greatly reduced in comparison with a conventional management information memory whose access rate is two reads two writes.

Because the access rate of the conventional management information memory is two reads two writes, the conventional management information memory needs four ports. Consequently, an area and power consumption of the conventional management information memory are relatively large. Access rates of the first memory, the second memory, and the third memory in this embodiment of this application each are basically one read one write. An access rate of the second memory is one read $(1+1/16)$ writes. The access rate of the second memory can be reduced to one read one write provided that the physical device increases a clock rate by $1/16$. Therefore, after the physical device adjusts the clock rate, the first memory, the second memory, and the third memory all support one read one write per clock, and are all two-port memories. Apparently, performance requirements of the management information memories (that is, the three memories) can be significantly reduced by using the method provided in this embodiment of this application, so as to significantly reduce costs and power consumption of the management information memories.

In this embodiment of this application, the length of each link is used as link management information. A storage location of the length of each link may be either of the following: the first memory and the second memory.

In this embodiment, only an example in which the first memory stores the length of each link is used. In a method for storing the management information, when the physical device performs enqueue processing on the first link, and when the first link is not empty before the enqueue processing, the method further includes:

reading, by the physical device, a first length of the first link from the first memory, obtaining a new first length according to the first length and a total quantity of enqueued nodes, and updating the first length to the first memory; or when the physical device performs enqueue processing on the first link, and when the first link is not empty before the enqueue processing, the method further includes:

using, by the physical device, a total quantity of enqueued nodes as a first length of the first link, and updating the first length of the first link to the first memory; and when the physical device performs dequeue processing on the second link, and when the second link is not empty after the dequeue processing, the method further includes:

reading, by the physical device, a second length of the second link from the first memory, obtaining a new second length according to the second length and a total quantity of dequeued nodes, and updating the second length to the first memory.

When the first memory stores the length of each link, an access rate of the first memory is $(1+1/16)$ reads (reading the tail pointer, the length, and the first status identifier of the first link during enqueue processing on the first link, and reading the length of the second link for $1/16$ times in one cycle) $(1+1/16)$ writes (modifying the first tail pointer, further modifying the first status identifier when the first link is empty before the enqueue processing, and modifying the length of the second link for $1/16$ times in one cycle). Therefore, the access rate of the first memory is reduced to one read one write provided that the physical device adjusts a cycle rate. When the first memory stores the length of each link, a performance requirement of the first memory can also be reduced, so as to reduce costs and power consumption of the first memory.

The link management method provided in this embodiment of the present invention is applicable to a physical device that has two memories. The two memories include a first memory that stores a tail pointer of a link in a linked list and a second memory that stores a head pointer of the link. The physical device supports one time of enqueue processing and one time of dequeue processing in one clock cycle. The method is: when the physical device performs enqueue processing on a first link in the linked list, and when the first link is not empty before the enqueue processing, modifying, by the physical device, a first tail pointer that is of the first link and that is in the first memory; and when the physical device performs dequeue processing on a second link in the linked list, and when the second link is not empty after the dequeue processing, modifying, by the physical device, a second head pointer that is of the second link and that is in the second memory. It can be learned from the foregoing description that while input/output performance (supporting one enqueue operation and one dequeue operation in one clock cycle) of the physical device is ensured, both the first memory and the second memory only need to have a capability of one read one write, and the two memories each store only a part of link management information. Because an access rate of each memory is one read one write, and each memory is apparently a two-port memory, an area and power consumption of each memory can be significantly reduced in comparison with a conventional four-port management information memory. In addition, because each memory stores only a part of management information, storage pressure and a storage capacity requirement of each memory are also reduced. Therefore, performance requirements of the management information memories (that is, the two memories) are reduced by using the method, so as to reduce costs and power consumption of the management information memories.

Figure 2:
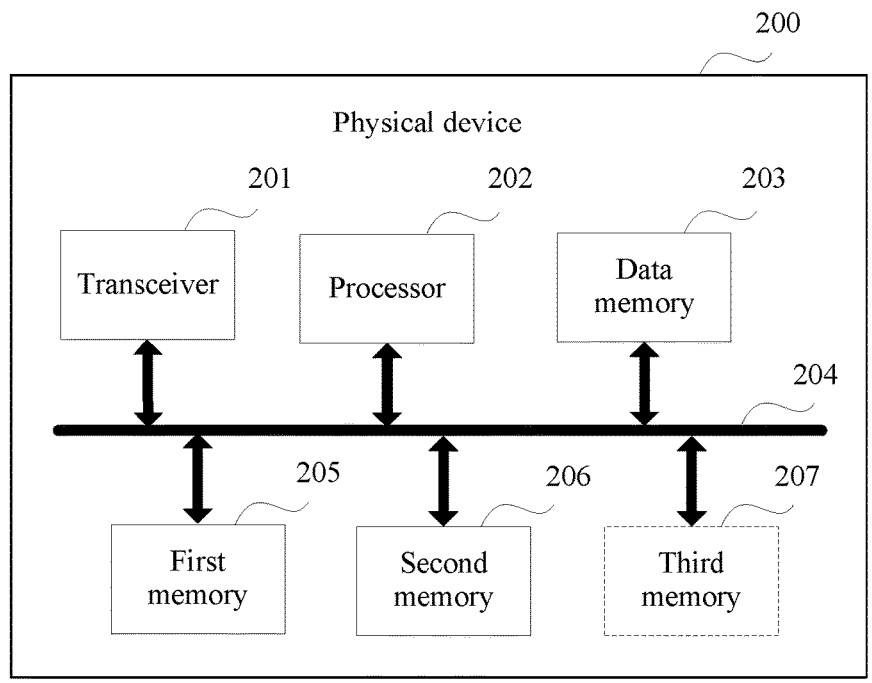
FIG. 2 is a structural diagram of a physical device according to an embodiment of this application.

Based on the foregoing embodiment, an embodiment of the present invention further provides a physical device, configured to implement the link management method shown in FIG. 1. Referring to FIG. 2, the physical device includes a transceiver 201, a processor 202, a data memory 203, a bus 204, a first memory 205, and a second memory 206.

The transceiver 201, the processor 202, the data memory 203, the first memory 205, and the second memory 206 are connected to each other by using the bus 204. The bus 204 may be a peripheral component interconnect (PCI for short) bus, an extended industry standard architecture (EISA for short) bus, or the like. The bus may be classified into an address bus, a data bus, a control bus, and the like. For ease of representation, the bus is represented by using only one thick line in FIG. 2. However, it does not mean that there is only one bus or only one type of bus.

The transceiver 201 is configured to communicatively interact with another device connected to the physical device 200.

The data memory 203 is configured to store a linked list, where the linked list includes multiple links.

The first memory 205 is configured to store a tail pointer of each link, and the second memory 206 is configured to store a head pointer of each link.

The physical device 200 is capable of implementing enqueue processing on a first link of the multiple links and dequeue processing on a second link of the multiple links in one clock cycle. The processor 202 is configured to implement the link management method shown in FIG. 1. The link management method includes:

when the physical device 200 performs enqueue processing on the first link, and when the first link is not empty before the enqueue processing, modifying a first tail pointer that is of the first link and that is in the first memory 205, so that the modified first tail pointer points to a storage location of the last node in the first link obtained after the enqueue processing; and when the physical device 200 performs dequeue processing on the second link, and when the second link is not empty after the dequeue processing, modifying a second head pointer that is of the second link and that is in the second memory 206, so that the modified second head pointer points to a storage location of the first node in the second link obtained after the dequeue processing.

Optionally, the first memory 205 is further configured to store a first status identifier of each link.

The second memory 206 is further configured to store a second status identifier of each link.

The physical device 200 further includes: a third memory 207, configured to store a third status identifier of each link, where a first status identifier of any link is the same as a second status identifier of the link, a combination of the first status identifier and a third status identifier of the link is used to indicate whether the link is empty, and a combination of the second status identifier and the third status identifier of the link is used to indicate whether the link is empty.

The processor 202 is further configured to: when the physical device 200 performs enqueue processing on the first link, determine whether the first link is empty before the enqueue processing, specifically including:

reading, by the processor 202, a first status identifier and a third status identifier of the first link respectively from the first memory 205 and the third memory 207; and determining, by the processor 202 according to the first status identifier and the third status identifier of the first link, whether the first link is empty before the enqueue processing.

Optionally, the processor 202 is further configured to:

when the physical device 200 performs dequeue processing on the second link, and when the second link is empty after the dequeue processing, modify, according to a second status identifier that is of the second link and that is in the second memory, a third status identifier that is of the second link and that is in the third memory 207, so that a combination of the second status identifier and the modified third status identifier of the second link indicates that the second link obtained after the dequeue processing is empty.

Optionally, the processor 202 is further configured to:

when the physical device 200 performs enqueue processing on the first link, and when the processor determines that the first link is empty before the enqueue processing, perform the following operations:

modifying the first status identifier that is of the first link and that is in the first memory 205, so that a combination of the third status identifier and the modified first status identifier of the first link indicates that the first link obtained after the enqueue processing is not empty;

modifying the first tail pointer that is of the first link and that is in the first memory 205, so that the modified first tail pointer points to the storage location of the last node in the first link obtained after the enqueue processing;

modifying a second status identifier that is of the first link and that is in the second memory 206, so that a modified second status identifier of the first link is the same as the modified first status identifier of the first link; and modifying a first head pointer that is of the first link and that is in the second memory 206, so that the modified first head pointer points to a storage location of the first node in the first link obtained after the enqueue processing.

Optionally, the first memory 205 is further configured to store a length of each link.

The processor 202 is further configured to: when the physical device 200 performs enqueue processing on the first link, and when the first link is not empty before the enqueue processing, read a first length of the first link from the first memory 205, obtain a new first length according to the first length and a total quantity of enqueued nodes, and update the first length to the first memory 205.

The processor 202 is further configured to: when the physical device 200 performs enqueue processing on the first link, and when the first link is not empty before the enqueue processing, use a total quantity of enqueued nodes as a first length of the first link, and update the first length of the first link to the first memory 205.

The processor 202 is further configured to: when the physical device 200 performs dequeue processing on the second link, and when the second link is not empty after the dequeue processing, read a second length of the second link from the first memory 205, obtain a new second length according to the second length and a total quantity of dequeued nodes, and update the second length to the first memory 205.

Optionally, the data memory 203 is further configured to store program and the like. Specifically, the program may include program code, and the program code includes a computer operation instruction. The data memory 203 may include a random access memory (Random Access Memory, RAM for short), and may further include a nonvolatile memory (non-volatile memory) such as at least one magnetic disk memory. The processor 202 executes the application program stored in the data memory 203 and implements the foregoing function, so as to implement the link management method shown in FIG. 1.

By using the physical device provided in this embodiment of this application, the physical device supports one time of enqueue processing and one time of dequeue processing in one clock cycle. When the physical device performs enqueue processing on a first link in the stored linked list, and when the first link is not empty before the enqueue processing, the physical device modifies a first tail pointer that is of the first link and that is in the first memory. When the physical device performs dequeue processing on a second link in the linked list, and when the second link is not empty after the dequeue processing, the physical device modifies a second head pointer that is of the second link and that is in the second memory. It can be learned from the foregoing description that while input/output performance (supporting one enqueue operation and one dequeue operation in one clock cycle) of the physical device is ensured, access rates of the first memory and the second memory are greatly reduced, both the first memory and the second memory only need to have a capability of one read one write, and the two memories each store only a part of link management information. Because an access rate of each memory is one read one write, and each memory is apparently a two-port memory, an area and power consumption of each memory can be significantly reduced in comparison with a conventional four-port management information memory. In addition, because each memory stores only a part of management information, storage pressure and a storage capacity requirement of each memory are also reduced. Therefore, the physical device reduces performance requirements of the management information memories (that is, the two memories), so as to reduce costs and power consumption of the management information memories.

The embodiments of this application provide a link management method and a physical device. The physical device has two memories configured to store management information of each link in a linked list. The two memories include a first memory that stores a tail pointer of the link and a second memory that stores a head pointer of the link. The physical device supports one time of enqueue processing and one time of dequeue processing in one clock cycle, and manages the link management information in the first memory and in the second memory. Therefore, while input/output performance (supporting one enqueue operation and one dequeue operation in one clock cycle) of the physical device is ensured, access rates of the first memory and the second memory are greatly reduced, both the first memory and the second memory only need to have a capability of one read one write, and the two memories each store only a part of link management information. Because an access rate of each memory is one read one write, and each memory is apparently a two-port memory, an area and power consumption of each memory can be significantly reduced in comparison with a conventional four-port management information memory. In addition, because each memory stores only a part of management information, storage pressure and a storage capacity requirement of each memory are also reduced. Therefore, performance requirements of the management information memories (that is, the two memories) are reduced by using the method, so as to reduce costs and power consumption of the management information memories.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, so as to generate computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, a person skilled in the art can make changes and modifications to these embodiments once they learn the basic inventive concept. Therefore, the following claims are intended to be construed as to cover the preferred embodiments and all changes and modifications falling within the scope of this application.

Apparently, a person skilled in the art can make various modifications and variations to the embodiments of this application without departing from the spirit and scope of the embodiments of the present invention. This application is intended to cover these modifications and variations provided that they fall within the scope of protection defined by the following claims and their equivalent technologies.

What is claimed is:

1. A link management method, comprising:
performing, by a physical device that has a first memory and a second memory, enqueue processing on a first link, wherein the first memory is configured to store a tail pointer of each of multiple links comprised in a linked list, wherein the second memory is configured to store a head pointer of each link, wherein the physical device is capable of implementing enqueue processing on the first link and dequeue processing on a second link in one clock cycle, and the first link and the second link are both links of the multiple links, and wherein the first link is not empty before the enqueue processing, the enqueue processing comprising:

modifying, by the physical device, a first tail pointer that is of the first link and that is in the first memory, so that the modified first tail pointer points to a storage location of the last node in the first link obtained after the enqueue processing; and performing, by the physical device, dequeue processing on the second link, wherein the second link is not empty after the dequeue processing, the dequeue processing comprising:

modifying, by the physical device, a second head pointer that is of the second link and that is in the second memory, so that the modified second head pointer points to a storage location of the first node in the second link obtained after the dequeue processing.

2. The method according to claim 1, wherein the first memory further stores a first status identifier of each link, the second memory further stores a second status identifier of each link, the physical device further has a third memory, the third memory is configured to store a third status identifier of each link, a first status identifier of any link is the same as a second status identifier of the link, a combination of the first status identifier and a third status identifier of the link is used to indicate whether the link is empty, and a combination of the second status identifier and the third status identifier of the link is used to indicate whether the link is empty; and when the physical device performs enqueue processing on the first link, the determining, by the physical device, whether the first link is empty before the enqueue processing, comprises:

reading, by the physical device, a first status identifier and a third status identifier of the first link respectively from the first memory and the third memory; and determining, by the physical device according to the first status identifier and the third status identifier of the first link, whether the first link is empty before the enqueue processing.

3. The method according to claim 2, wherein when the physical device performs dequeue processing on the second link, the method further comprises:

when the second link is empty after the dequeue processing, modifying, by the physical device according to a second status identifier that is of the second link and that is in the second memory, a third status identifier that is of the second link and that is in the third memory, so that a combination of the second status identifier and the modified third status identifier of the second link indicates that the second link obtained after the dequeue processing is empty.

4. The method according to claim 2, wherein when the physical device performs enqueue processing on the first link, the method further comprises:

when the physical device determines that the first link is empty before the enqueue processing, performing, by the physical device, the following operations:

modifying the first status identifier that is of the first link and that is in the first memory, so that a combination of the third status identifier and the modified first status identifier of the first link indicates that the first link obtained after the enqueue processing is not empty;

modifying the first tail pointer that is of the first link and that is in the first memory, so that the modified first tail pointer points to the storage location of the last node in the first link obtained after the enqueue processing;

modifying a second status identifier that is of the first link and that is in the second memory, so that a modified second status identifier of the first link is the same as the modified first status identifier of the first link; and modifying a first head pointer that is of the first link and that is in the second memory, so that the modified first head pointer points to a storage location of the first node in the first link obtained after the enqueue processing.

5. The method according to claim 4, wherein the first memory further stores a length of each link;

when the physical device performs enqueue processing on the first link, and when the first link is not empty before the enqueue processing, the method further comprises:

reading, by the physical device, a first length of the first link from the first memory, obtaining a new first length according to the first length and a total quantity of enqueued nodes, and updating the first length to the first memory; or using, by the physical device, a total quantity of enqueued nodes as a first length of the first link, and updating the first length of the first link to the first memory; and when the physical device performs dequeue processing on the second link, and when the second link is not empty after the dequeue processing, the method further comprises:

reading, by the physical device, a second length of the second link from the first memory, obtaining a new second length according to the second length and a total quantity of dequeued nodes, and updating the second length to the first memory.

6. A physical device, comprising:

a first memory, configured to store a tail pointer of each link, wherein the physical device stores a linked list, the linked list comprises multiple links, the physical device is capable of implementing enqueue processing on a first link and dequeue processing on a second link in one clock cycle, and the first link and the second link are both links of the multiple links;

a second memory, configured to store a head pointer of each link; and a processor, configured to: when the physical device performs enqueue processing on the first link, and when the first link is not empty before the enqueue processing, modify a first tail pointer that is of the first link and that is in the first memory, so that the modified first tail pointer points to a storage location of the last node in the first link obtained after the enqueue processing; and when the physical device performs dequeue processing on the second link, and when the second link is not empty after the dequeue processing, modify a second head pointer that is of the second link and that is in the second memory, so that the modified second head pointer points to a storage location of the first node in the second link obtained after the dequeue processing.

7. The physical device according to claim 6, wherein the first memory is further configured to store a first status identifier of each link;

the second memory is further configured to store a second status identifier of each link;

the physical device further comprises: a third memory, configured to store a third status identifier of each link, wherein a first status identifier of any link is the same as a second status identifier of the link, a combination of the first status identifier and a third status identifier of the link is used to indicate whether the link is empty, and a combination of the second status identifier and the third status identifier of the link is used to indicate whether the link is empty; and the processor is further configured to: when the physical device performs enqueue processing on the first link, determine whether the first link is empty before the enqueue processing, and the processor is specifically configured to:

read, by the processor, a first status identifier and a third status identifier of the first link respectively from the first memory and the third memory; and determine, by the processor, according to the first status identifier and the third status identifier of the first link, whether the first link is empty before the enqueue processing.

8. The physical device according to claim 7, wherein the processor is further configured to:

when the physical device performs dequeue processing on the second link, and when the second link is empty after the dequeue processing, modify, according to a second status identifier that is of the second link and that is in the second memory, a third status identifier that is of the second link and that is in the third memory, so that a combination of the second status identifier and the modified third status identifier of the second link indicates that the second link obtained after the dequeue processing is empty.

9. The physical device according to claim 7, wherein the processor is further configured to, when the physical device performs enqueue processing on the first link, and when the processor determines that the first link is empty before the enqueue processing, perform the following operations:

modifying the first status identifier that is of the first link and that is in the first memory, so that a combination of the third status identifier and the modified first status identifier of the first link indicates that the first link obtained after the enqueue processing is not empty;

modifying the first tail pointer that is of the first link and that is in the first memory, so that the modified first tail pointer points to the storage location of the last node in the first link obtained after the enqueue processing;

modifying a second status identifier that is of the first link and that is in the second memory, so that a modified second status identifier of the first link is the same as the modified first status identifier of the first link; and modifying a first head pointer that is of the first link and that is in the second memory, so that the modified first head pointer points to a storage location of the first node in the first link obtained after the enqueue processing.

10. The physical device according to claim 9, wherein:

the first memory is further configured to store a length of each link;

the processor is further configured to:

when the physical device performs enqueue processing on the first link, and when the first link is not empty before the enqueue processing, read a first length of the first link from the first memory, obtain a new first length according to the first length and a total quantity of enqueued nodes, and update the first length to the first memory; or when the physical device performs enqueue processing on the first link, and when the first link is not empty before the enqueue processing, use a total quantity of enqueued nodes as a first length of the first link, and update the first length of the first link to the first memory; and the processor is further configured to: when the physical device performs dequeue processing on the second link, and when the second link is not empty after the dequeue processing, read a second length of the second link from the first memory, obtain a new second length according to the second length and a total quantity of dequeued nodes, and update the second length to the first memory.

\* \* \* \* \*